United States Patent [19]

Fischer et al.

[11] Patent Number: 5,337,652
[45] Date of Patent: Aug. 16, 1994

[54] ESPRESSO MACHINE

[75] Inventors: Daniel Fischer; Arthur Eugster, both of Romanshorn, Switzerland

[73] Assignee: Arthur Eugster Ag, Romanshorn, Switzerland

[21] Appl. No.: 915,438

[22] Filed: Jul. 17, 1992

[30] Foreign Application Priority Data

Jul. 19, 1991 [EP] European Pat. Off. ........ 91112197.8

[51] Int. Cl.[5] .................................................. A47J 31/32
[52] U.S. Cl. ........................................... 99/282; 99/281; 99/283; 99/292; 99/299; 99/302 R
[58] Field of Search ............... 99/281, 282, 283, 284, 99/292, 294, 299, 300, 302 R, 317, 280, 279, 295, 298, 316

[56] References Cited

U.S. PATENT DOCUMENTS

| 423,127 | 3/1890 | Childs | 99/294 |
|---|---|---|---|
| 1,409,123 | 3/1922 | Simonton | 99/294 |
| 2,906,193 | 9/1959 | McCauley | 99/283 |
| 3,031,947 | 5/1962 | Heuckeroth | 99/283 |
| 4,204,465 | 5/1980 | Knecht | 99/300 |
| 4,287,817 | 9/1981 | Moskowitz et al. | 99/282 |
| 4,484,515 | 11/1984 | Illy | 99/282 |
| 4,505,191 | 3/1985 | Longo | 99/300 |
| 4,581,239 | 4/1986 | Woolman et al. | 99/282 |
| 4,633,771 | 1/1987 | Anderl | 99/280 |
| 4,947,738 | 8/1990 | Eugster | 99/300 |
| 4,998,462 | 3/1991 | Sekiguchi | 99/302 R |
| 5,019,690 | 5/1991 | Knepler | 99/281 |
| 5,127,318 | 7/1992 | Selby, III | 99/299 |

FOREIGN PATENT DOCUMENTS

| 0124473 | 11/1984 | European Pat. Off. . |
| 0264352 | 4/1988 | European Pat. Off. . |
| 0307497 | 3/1989 | European Pat. Off. . |
| 3035157 | 4/1982 | Fed. Rep. of Germany . |
| 2465451 | 3/1981 | France . |
| 0443530 | 12/1948 | Italy ........................ 99/294 |
| 0019311 | of 1911 | United Kingdom ................... 99/294 |

*Primary Examiner*—Timothy F. Simone
*Assistant Examiner*—James F. Hook
*Attorney, Agent, or Firm*—Darby & Darby

[57] ABSTRACT

This invention relates to an espresso machine comprising a boiler (1) and a filter chamber (5) which is connected to the boiler (1) via a hot water line (11) and which comprises an outlet (18) and is divided via an inserted screen (6) into two chamber regions (b, c), a thermostat switch (TH1) which is responsive to the temperature within the boiler (1) and connected in series with the heating apparatus (2) to limit the temperature within the boiler to a predetermined upper value, an air pump (8) terminating in the boiler (1), a first shut-off valve (17) positioned in the hot water line (11) and a second shut-off valve (19) positioned upstream of the outlet of the filter chamber (5).

20 Claims, 4 Drawing Sheets

ESPRESSO MACHINE

DESCRIPTION

The present invention relates to an electric espresso machine with pump drive.

In contrast to coffee machines, espresso machines operate such that the ground coffee is extracted by means of pressurized hot water. Pressure is built up either by the steam pressure of the water heated above the boiling temperature, or by a pump. In pump-type espresso machines cold water is normally pumped from a reservoir through an electric flow-type heater which is provided with a thermostat for limiting the water temperature to an upper value.

The various systems that are known yield very different pressure and temperature profiles under which the ground coffee is extracted. The taste of the resultant expresso is substantially determined by these profiles because the various aromatic substances within the ground coffee dissolve to different degrees in response to the pressure and temperature and also to the length of time during which pressure and temperature act thereon, and they may also be distorted by temperatures that are too high. Furthermore, a typical foamy head or cream which is only obtained under certain conditions is desired for an espresso coffee.

It is the object of the present invention to provide an espresso machine with pump drive which is of simple construction and supplies a high-quality espresso.

This object is attained through the features outlined in claim 1.

The present invention starts from the finding that with a pump-type espresso machine the temperature and pressure profiles that are required for the preparation of a delicious espresso coffee can be easily achieved in the ground coffee over the period of the brewing operation with the aid of the two shut-off valves positioned within the flow region of the hot water. To be more specific, the shut-off valve positioned in front of the chamber for the ground coffee prevents the ground coffee from being already wetted when the water is being heated, i.e. before the brewing operation proper, as well as the rise of pressure caused thereby within the boiler.

Advantageous developments follow from the subclaims.

The present invention shall now be explained in more detail with reference to an embodiment illustrated in the drawing, in which.

Figure 1:
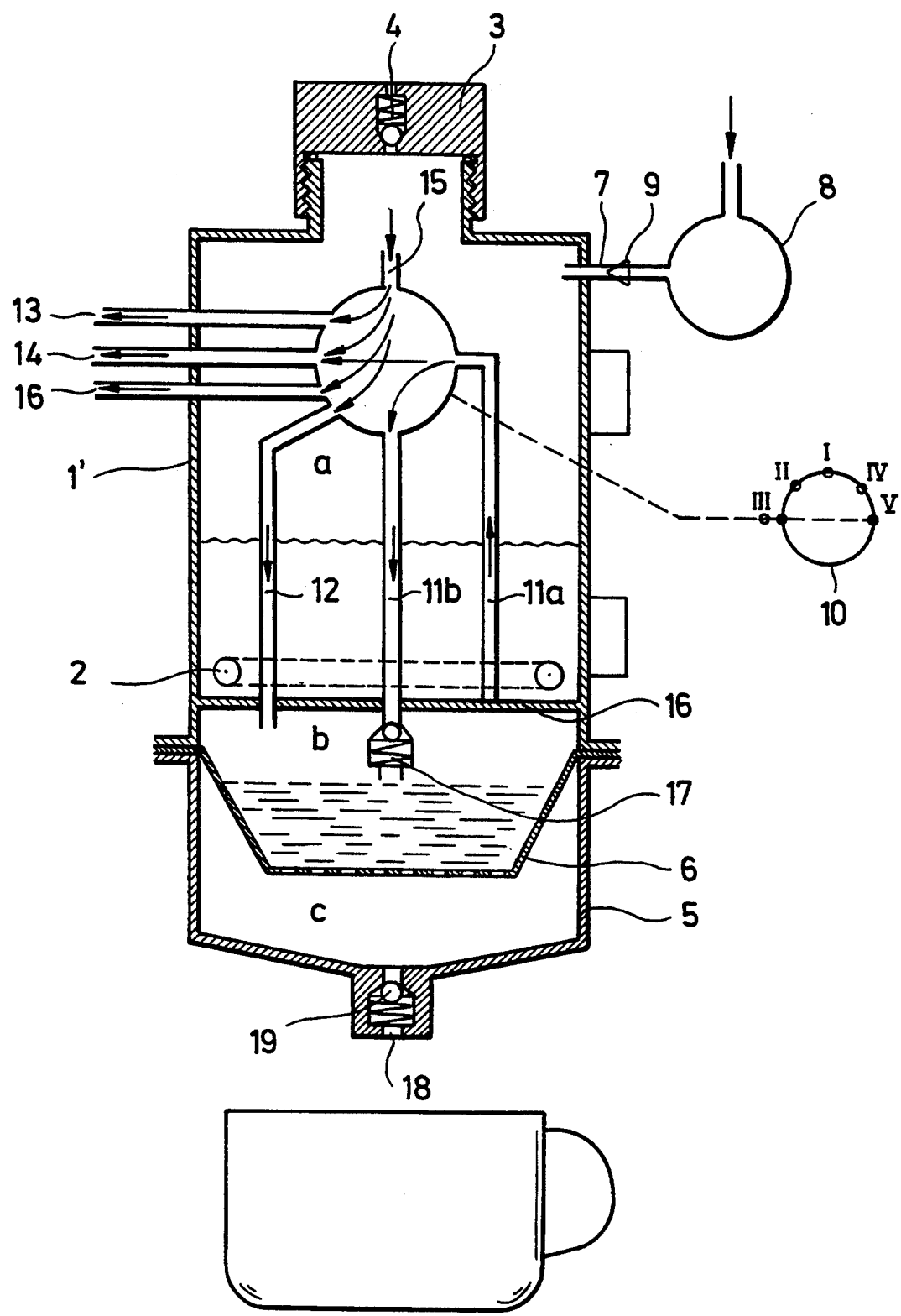
FIG. 1 is a diagrammatic view of the espresso machine.

The espresso machine shown in FIG. 1 comprises a boiler 1 whose lower portion includes an electric heating means 2 which is only shown diagrammaticly because its exact configuration and arrangement are of no further interest in the present case. The heating means 2 which is here used is normally integrated into a bottom part of the boiler 1. The upper portion of the boiler 1 is provided with a lid 3 that can be screwed onto the boiler 1 and includes a safety valve 4. A detachable filter chamber 5 which is provided with a handle (not shown in more detail) and has arranged therein a trough-shaped filter screen 6 is positioned below the boiler 1. The filter chamber 5 is detachably connected to the boiler 1 via a standard pressure-tight bayonet lock. An air pipe 7 which has connected thereto an electrically operated air pump 8 terminates in the upper region of the boiler 1. In response to the type of air pump 8 used, a valve 9 which permits air to flow only towards the boiler 1 and prevents water or steam from passing to the pump 8 may be arranged in the air pipe 7.

A multiway valve 10 which is accessible to the user of the machine from the outside and permits the establishment of only one connection between the inlet and outlet pipes and closes all other connections is diagrammatically drawn in the upper chamber of the boiler 1. The following pipes are connected to the multiway valve:

11a hot water inlet pipe
11b hot water outlet pipe
12 steam discharge pipe
13 steam discharge pipe
14 hot water outlet pipe
15 steam inlet pipe
16 steam discharge pipe The hot water inlet pipe 11a is positioned with its inlet port in the lowermost part of the boiler 1. The steam discharge pipe 13, the hot water outlet pipe 14 and the steam discharge pipe 16 terminate outside the boiler 1. The steam discharge pipe 13 and the hot water outlet pipe 14 may also be combined to form one line and terminate in a common foaming nozzle or the like. By contrast, the steam discharge pipe 16 terminates outside the boiler 1 at a place where the steam can condense and the condensation water is collected, preferably at a point within the base part of the machine below the shelf area for the cup where a collecting pan is normally provided. The hot water outlet pipe 11b is passed through the bottom wall 1a of the boiler 1 and terminates in a first shut-off valve 17 whose function will be explained further below. The steam discharge pipe 12 is also passed through the bottom wall 1a of the boiler 1 and terminates, like the hot water outlet pipe 11b, in the filter chamber 5. The hot water outlet pipe 11b and the steam discharge pipe 12 may also be combined to form one line. The end of the steam inlet pipe 15 at the inlet side is located in the uppermost region of the boiler 1. The following connections which are designated with I through V can be established in this multiway valve 10:

I "zero position"
  steam inlet pipe 15 + steam discharge pipe 16
II "espresso end"
  steam inlet pipe 15 + and steam discharge pipe 12
III "espresso"
  hot water inlet pipe 11a + hot water outlet pipe 11b
IV "external brewing"
  hot water inlet pipe 11a + hot water outlet pipe 14
V "external foaming"
  steam inlet pipe 15 + steam discharge pipe 13

At the right side next to FIG. 1, the multiway valve 10 is drawn in with these five positions. Positions IV and V can be reached from the uppermost zero position to the right, while to the left positions II and III can be chosen. This arrangement has the effect that for instance zero position I can only be reached from position III "espresso" via the intermediate position II "espresso end". These relations will be explained in more detail further below.

Figure 3:
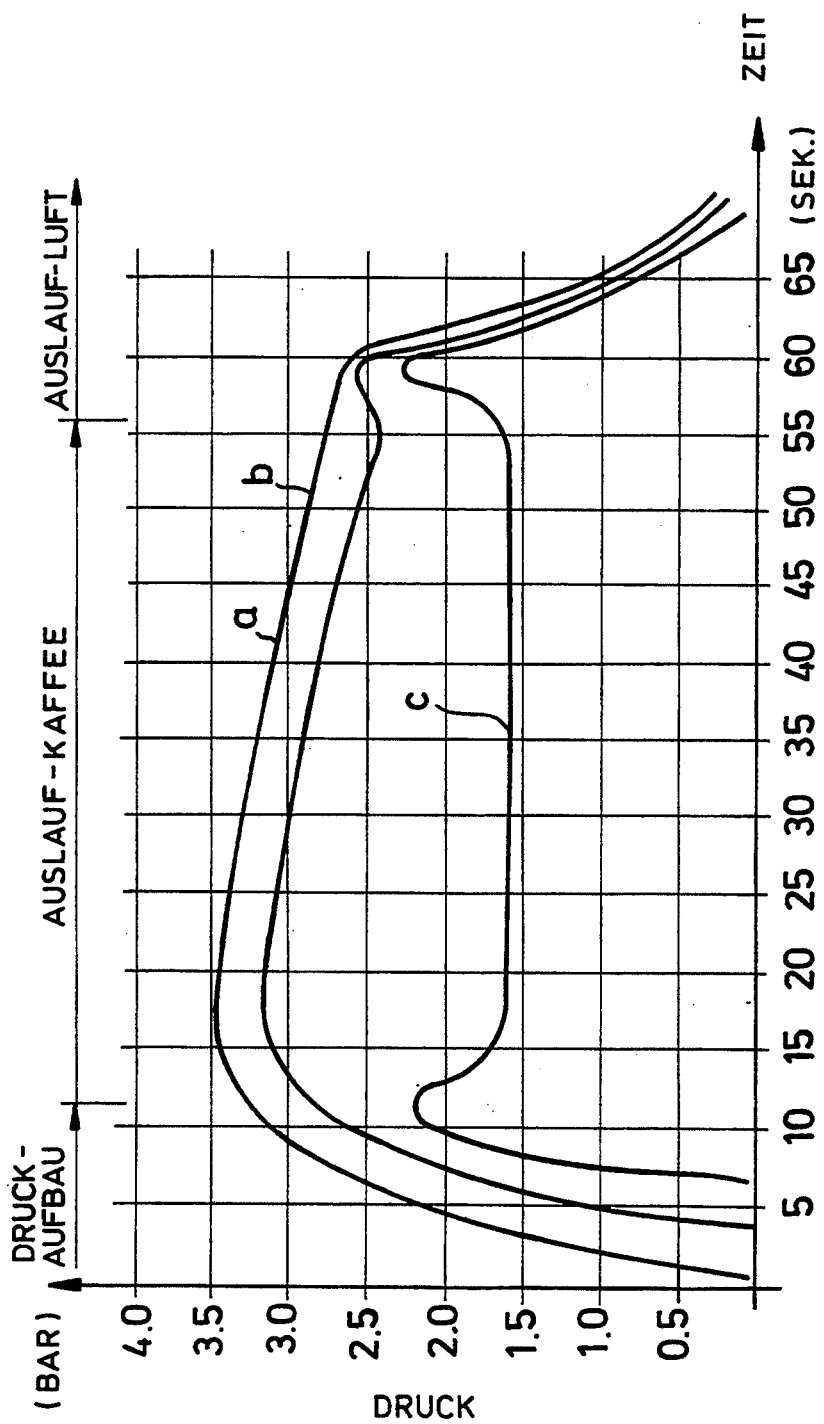
FIG. 3 is a pressure-time diagram with three curves a, b and c.

A filter outlet 18 in which a second shut-off valve 19 is arranged is provided in the lowermost region of the filter chamber 5. Both shut-off valves 17 and 19 are biased to a specific pressure difference, i.e. they permit the flow of water or also of air or steam not only exclusively in the discharge direction, but also open only if a specific pressure difference exists between their inlet and their outlet. In the illustrated embodiment, the shut-off valve 17 opens at a pressure of 1.8 bar and the second shut-off valve at a pressure of 2.2 bar. The first pressure reducing valve 17 additionally exhibits the special feature that it has a pronounced hysteresis and that it only closes again at 0.3 bar after having opened at 1.8 bar. This prevents flutter of the valve that might be caused by the valve immediately closing again after its opening when the pressure in the boiler 1 has been reduced to a small degree, and by the valve opening again immediately when the air pump 8 has again compensated for this small pressure reduction. As a result, the pressure loss between valve inlet and valve outlet is also kept small at 0.3 bar. Furthermore, these valve characteristics effect a very rapid rise of pressure in the filter chamber 5 after the valve has opened. The rapid rise of pressure is accompanied by a gush-like flow of pressurized water into the upper region b of the filter chamber 5 and a rapid and complete penetration of the ground coffee provided above the filter screen 6. This is important because the temperature of the pressurized water hardly drops and is kept constant. Moreover, the two shut-off valves 17 and 19 are matched to each other such that the shut-off valve 17 has a greater flow section than the shut-off valve 19 to ensure that the filter chamber 5 above the shut-off valve 17 can be filled with brewing water at a rate faster than the rate at which it is emptied through the shut-off valve 19. The second shut-off valve opens only if the pressure in the lower portion c of the filter chamber 5 has risen to 2.2 bar. This valve 19 should be constructed such that it substantially keeps this pressure difference also in the opened state—though a small pressure drop as is normal with valves is hardly objectionable. In the diagram of FIG. 3, the pressure drops from an initial opening pressure from 2.2 bar to 1.6 bar.

Two thermostat switches TH1 and TH2 that are responsive to the temperature of the water or steam in the boiler 1 are additionally provided in the boiler region. Their switching function will be explained further below. The thermostat switch TH1 has its switching point at about 90°–95° while the switching point of the thermostat switch TH2 is at about 130° C. to 140° C. Both switches have a normal hysteresis of about 5%, i.e. a switch of such a type switches off at e.g. 95° C. and only switches on again at about 90° C. after the switch-off operation.

Figure 2:
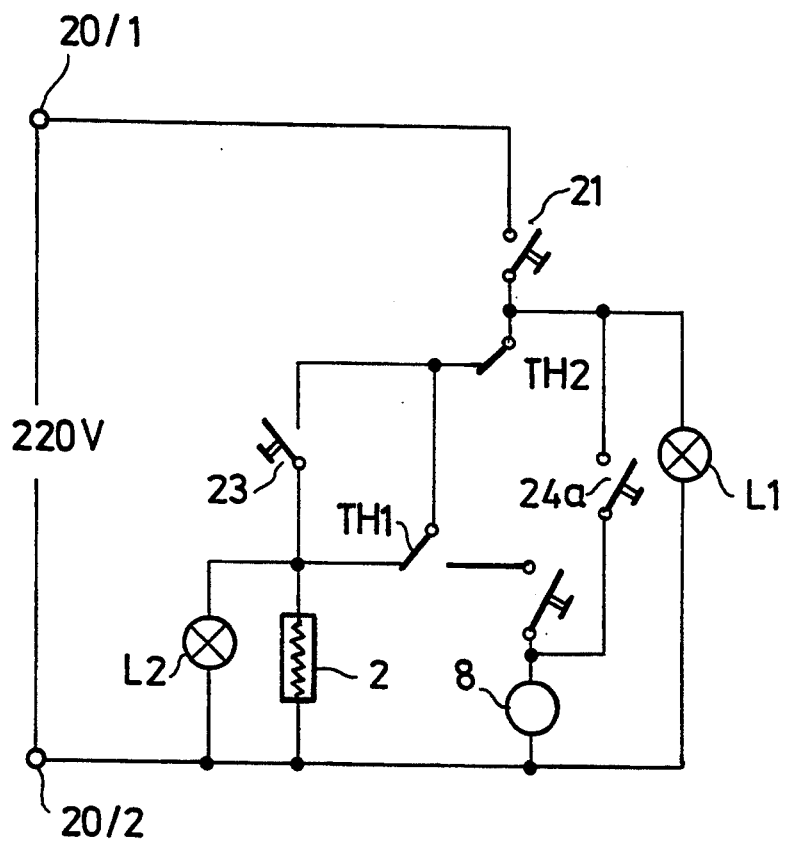
FIG. 2 shows the electrical wiring diagram of the espresso machine of FIG. 1.

FIG. 2 is the wiring diagram of the espresso machine shown in FIG. 1. The power supply input terminals, normally 220 V AC voltage, are designated with 20/1 and 20/2. A mains switch 21 which supplies a lamp L1 with power is provided at the input terminal 20/1. Said lamp L1 indicates the ON state of the machine. The heating means 2 is arranged in parallel with the lamp L1 across the series connection consisting of the two thermostat switches TH1 and TH2. Hence, the heating means 2 is only supplied with power if the two thermostat switches TH1 and TH2 are in the drawn position, i.e. the temperature is below 95° C. in the case of the above-mentioned configuration of the two thermostat switches. A lamp 22 is arranged in parallel with the heating means 2. It gives light when voltage is applied to the heating means 2. This means that the brewing temperature or steam temperature has not been reached yet. A steam switch 23 is arranged in parallel with the thermostat switch TH1. The pump 8 is connected via a separate pump switch 24 to the switching contact of the thermostat switch TH1 that is established by the switch in the hot state. The pump 8 can be operated independently of the thermostat switch TH1 with the aid of another pump switch 24a.

The function of the espresso machine shall now be explained in the following.

After the lid 3 has been unscrewed, the amount of water that will probably be needed for the subsequent operation is filled into the boiler 1. The amount of water is not crucial because the brewing operation can be interrupted at any time, for instance, in case of an imminent overflow of the espresso cup positioned below the outlet. Attention should merely be paid that the boiler 1 is not filled with water up to the brim because otherwise an adequate volume of compressed air might not be available. The lid 3 is then closed and the machine is operative after the main switch 21 has been switched on. As becomes apparent from the wiring diagram of FIG. 2, the heating means 2 is immediately energized after the mains switch 21 has been switched on—though the machine is still in the cold state—and the lamp L2 shines. As long as the water in the boiler 1 is below 95° C., the two thermostat switches TH1 and TH2 are in the left position drawn. The pump 8 is out of operation. The water is now heated continuously until it reaches a temperature of 95° C. At this temperature, the thermostat switch TH1 switches into its right position and the lamp L2 no longer shines, thereby indicating that the machine is ready for the other operational stages. Depending on whether one first wishes to make espresso or rather to heat and foam milk, the operation selector switch which communicates with the multiway valve 10 is brought into one of the positions II through IV.

Let's first consider operation III "espresso". In this position the multiway valve 10 connects the hot water inlet pipe 11a with the hot water outlet pipe 11b. The pump switch 24 is also switched on in this position III. The pump 8, however, is only operative if the thermostat switch TH1 is in its right position, i.e. the water in the boiler 1 has already reached 95° C. This prevents the pump 8 from becoming already operative before the brewing temperature has been reached. The temperature switch TH1 has a hysteresis so that the pump 8 is not already switched off again at a small temperature drop, with the switch TH1 only switching back again at a temperature drop of 5° C. (95° C. OFF–90° C. ON). As long as the pressure in the boiler 1 is below the opening pressure of the shut-off valve 17, the filter chamber 5 remains unpressurized. It is only after the pressure in the boiler 1 has risen to 1.8 bar that hot water is pressed through the hot water pipe 11a, 11b and the shut-off valve 17. Since this shut-off valve 17 has hysteresis properties and only keeps a pressure difference of 0.3 bar after opening at 1.8 bar, the pressure inside the filter chamber 5 rises rapidly and the ground coffee is completely wetted very rapidly and brought to brewing temperature. It is only when the pressure in the region c of the filter chamber 5 below the filter screen 6 has risen to the opening pressure of the shut-off valve 19 that this valve 19 opens and releases espresso via the outlet 18. This operation is continued for about 50 sec. The abovedescribed facts are clearly illustrated in the diagram of FIG. 3, in which:

a—represents the pressure in the boiler 1;
b—represents the pressure in the filter chamber 5 above the filter screen 6; and
c—represents the pressure in the filter chamber 5 below the filter screen 6.

The pressure difference between curves b and c is due to the fact that the wetted ground coffee acts as a throttling point. In the diagram, curve b illustrates the hysteresis of the shut-off valve 17 very clearly. The shut-off valve 17 opens for the first time after about 5 sec and at 1.8 bar and subsequently just maintains a pressure difference of 0.3 bar. This has the effect that a relative great amount of brewing water is poured over the ground coffee in a gush, whereby it is ensured that the ground coffee is wetted not only locally, but over the entire surface. Furthermore, the pressure in the filter chamber 5 builds up rapidly. As a result, considerable flow rates which contribute to the desired extraction or washout are obtained in the fine flow channels within the ground coffee.

After the desired amount of espresso has been brewed, the selector switch on the multiway valve 10 is moved back from position III to position II "espresso end". In the diagram of FIG. 3, this happens at about 55 sec. In this state II the steam inlet pipe 15 is connected to the steam discharge pipe 12, i.e. hot water no longer flows through the ground coffee, but rather hot air or steam. Since a valve which corresponds to the shut-off valve 17 does not exist in this pipe connection, the pressure in the filter chamber 5 rises rapidly to the pressure prevailing in the boiler 1. Since air or steam is pressed much more rapidly through the ground coffee than water, this pressure also builds up rapidly in the area below the filter screen 6 and the total pressure in the boiler 1 is reduced just as rapidly. These operational characteristics have the effect that the ground coffee is once again washed out in an abrupt way at the end of the brewing operation and is foamed by the steam and air, respectively. A very thick head or cream is formed thereby, giving the espresso not only an additional special flavor, but also a thick foam layer. Moreover, the ground coffee is virtually dried by the air throughput, which simplifies its later disposal considerably. With the abovementioned configuration of the multiway valve 10, this process is carried out automatically when one switches from position III to zero position I.

If the operator uses the intermediate position II only for a very short time and if the excess pressure in the boiler 1 is not yet reduced entirely, the zero position I ensures that excess pressure is discharged via the steam discharge pipe into the water collecting pan.

Let's now consider the additional switching positions IV and V. Switching position IV is of special importance insofar as brewing water is delivered through the hot water inlet pipe 11a and the second hot water outlet pipe 14 in said position. This mode of operation is e.g. used for preparing hot water in limited amounts, e.g. for pouring hot water over tea leves. This operationl position is normally not needed for preparing espresso unless one wishes to dilute the already prepared espresso with hot water or to heat cold milk with hot water. The second pump switch 24a that is connected in parallel with the series connection consisting of the pump switch 24 and the thermostat TH1 is closed in switching position IV. To warm up or foam cold milk, operating position V is normally used. In this operating position steam is ejected from the steam discharge pipe 13. To this end, the steam switch 23 which is shown in the wiring diagram of FIG. 2 and which may be force-coupled with the multiway valve 10 is closed. If this mode of operation is already set in the cold state of the machine, water is first heated by the heating means 2. Nothing happens before the water boils. Power is still supplied to the heating means 2 after the thermostat switch TH1 has moved to its right position (more than 95° C.) because voltage is still applied to the heating means via the thermostat switch TH2 and the steam switch 23. The operation of the heating means 2 is indicated by the lamp L2. As soon as the water boils, pressure builds up in the boiler 1 and steam is discharged. The pump 8 is not actuated in this mode of operation. The output of the heating means is chosen with respect to the passage cross-section of the steam discharge pipe 13 in such a way that the temperature of the water within the boiler can rise despite the open steam discharge pipe 13, so that the steam temperature can rise to a temperature up to 140° C. during prolonged operation. The thermostat switch TH2 opens at this temperature. As a result, milk can be foamed to a very substantial degree.

When the machine is switched back to the zero position I, the pressure prevailing in the boiler 1 is reduced via the steam discharge pipe 16 in the collecting pan, like at the end of the espresso preparation. As a result, the machine can be filled again very soon. An immediate new filling operation might be necessary in cases where such a small amount of water has been used that this amount is not sufficient for the operation.

Figure 4:
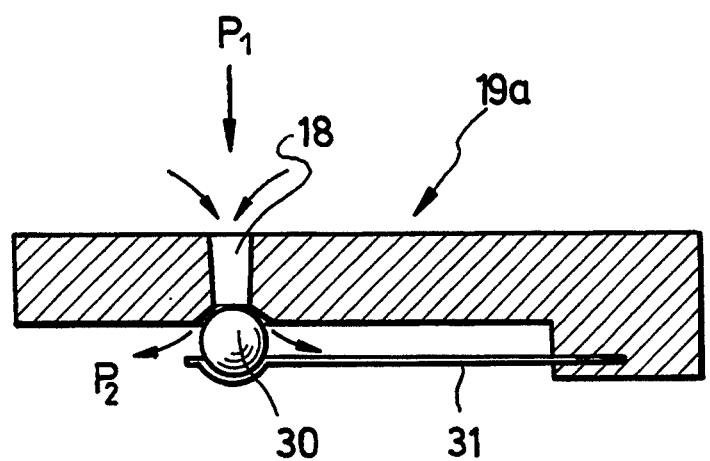
FIG. 4 is an enlarged view of a head or cream producing valve.

Although a satisfactory head or cream is formed with the above-described espresso machine due to the automatic work sequence without any further precautions having to be taken, this machine could even be improved by giving the shut-off valve 19 a special shape. The shut-off valve 19a which is shown in FIG. 4 comprises a ball 30 which seals the passage 18 and which is biased by a leaf spring 31. The outlet portion of the passage 18 has a conical seat surface which has such a large opening angle that the ball 30 fully enters this cone and comes into point-to-point contact at the transition point between said cone and the upper part of the hole. As soon as pressure p1 has risen to such an extent in comparison with the external pressure p2 that the valve opens, the espresso coffee is forced to flow past the ball 30 through a relatively narrow annular channel and then undergoes an immediate relaxation to the outer air pressure. As a result, there is a repeated foaming or cream formation.

We claim:

1. An espresso machine comprising a boiler and an electrical heating means connected to said boiler, a filter chamber which is connected to said boiler via a hot water line and which comprises an outlet and is divided via an inserted screen into two chamber regions, a thermostat switch which is responsive to the temperature within said boiler and connected in series with said heating means to limit the temperature within said boiler to a predetermined upper value, an air pump coupled to said boiler, a first shut-off valve positioned in said hot water line and a second shut-off valve positioned upstream of the outlet of said filter chamber, said first shut-off valve opening at a first pressure that is lower than a second pressure at which the second shut-off valve opens.

2. An espresso machine according to claim 1, characterized in that said thermostat switch is constructed such that it opens at a temperature of 95° C. within said boiler.

3. An espresso machine according to claim 2, characterized in that said thermostat switch is constructed such that after opening it closes again at a temperature which is about 5% lower than the opening temperature.

4. An espresso machine according to claim 3, characterized in that said first shut-off valve is constructed such that it opens at a pressure difference of about 1.8 bar.

5. An espresso machine according to claim 4, characterized in that said first shut-off valve is constructed such that after opening it remains open at a pressure difference of about 20% the pressure difference which existed during opening.

6. An espresso machine according to claim 4, characterized in that said second shut-off valve opens at a pressure difference of about 2.2 bar and substantially maintains said pressure difference in the opened state.

7. An espresso machine according to claim 5, characterized by a multi-way valve interposed in said hot water line upstream of said first shut-off valve, with the aid of which said hot water line can be shut off and a line connecting the upper boiler chamber to a steam outlet can be released.

8. An espresso machine according to claim 6, characterized by a second thermostat switch and means for replacing said first thermostat switch with said second thermostatic switch in an operation mode "steam discharge", said second thermostatic switch being constructed such that it limits the temperature with said boiler to a value of about 130° C.

9. An espresso machine according to claim 2, characterized in that said first shut-off valve is constructed such that it opens at a pressure difference of about 1.8 bar.

10. An espresso machine according to claim 1, characterized in that said first shut-off valve is constructed such that it opens at a pressure difference of about 1.8 bar.

11. An espresso machine according to claim 3, characterized in that said first shut-off valve is constructed such that after opening it remains open at a pressure difference of about 20% the pressure difference which existed during opening.

12. An espresso machine according to claim 2, characterized in that said first shut-off valve is constructed such that after opening it remains open at a pressure difference of about 20% the pressure difference which existed during opening.

13. An espresso machine according to claim 1, characterized in that said first shut-off valve is constructed such that after opening it remains open at a pressure difference of about 20% the pressure difference which existed during opening.

14. An espresso machine according to claim 3, characterized in that said second shut-off valve opens at a pressure difference of about 2.2 bar and substantially maintains said pressure difference in the opened state.

15. An espresso machine according to claim 2, characterized in that said second shut-off valve opens at a pressure difference of about 2.2 bar and substantially maintains said pressure difference in the opened state.

16. An espresso machine according to claim 1, characterized in that said second shut-off valve opens at a pressure difference of about 2.2 bar and substantially maintains said pressure difference in the opened state.

17. An espresso machine according to claim 4, characterized by a multi-way valve positioned in said hot water line, with the aid of which said hot water lien can be shut off and a line connecting the upper boiler chamber to a steam outlet can be released.

18. An espresso machine according to claim 3, characterized by a multi-way valve positioned in said hot water line, with the aid of which said hot water lien can be shut off and a line connecting the upper boiler chamber to a steam outlet can be released.

19. An espresso machine according to claim 2, characterized by a multi-way valve positioned in said shot water line, with the aid of which said hot water lien can be shut off and a line connecting the upper boiler chamber to a steam outlet can be released.

20. An espresso machine according to claim 1, characterized by a multi-way valve positioned in said hot water line, with the aid of which said hot water lien can be shut off and a line connecting the upper boiler chamber to a steam outlet can be released.

* * * * *